Inventor
Edward A. Johnston
By Paul O. Pippel
Att'y.

Patented Oct. 21, 1941

2,259,894

UNITED STATES PATENT OFFICE 2,259,894

COTTON PICKER

Edward A. Johnston, Chicago, Ill., assignor to International Harvester Company, a corporation of New Jersey Application February 15, 1939, Serial No. 256,446

4 Claims. (Cl. 56—43)

This invention relates to a picker construction. More specifically it relates to a driving mechanism for a cotton picker.

In cotton pickers of the type which employs rotating spindles, it is the usual practice to mount the spindles on a drum or belt and to move the drum or belt at such speed that they have no movement of translation with respect to the plants while they are in engagement therewith. This is generally carried out by bodily moving the spindles with respect to the picker frame at the same speed as the picker moves over the ground. However, even under the most ideal conditions, there is some slippage of the wheels of the picker with respect to the ground. This slippage is normally, under ideal conditions, from 1 to 3 per cent. and under other conditions may be considerably higher. Thus, with the ground speed of the picker reduced by slippage of the wheels, there is some relative movement between the picker spindles and the plants, which may under certain conditions be sufficient to injure or to pull out the plants. It is the purpose of the present invention to overcome the aforesaid difficulties.

An object of the present invention is to provide an improved picker construction.

A further object of the invention is the provision of an improved driving mechanism for the picking spindles of a cotton picker.

Another object is to provide a driving mechanism for cotton picker spindles which will eliminate the pulling out of the plants by the spindles.

According to the present invention, a plurality of cotton picker spindles is mounted on carrying means, such as a pair of belts, so as to travel in predetermined paths with the spindles on one belt successively in overlapping relation with spindles on the other belt. The source of power for driving the spindles is a tractor upon which the picker is mounted, and, as part of the driving connection between the belts carrying the spindles and the source of power, there are provided. overrunning clutches. With this arrangement the picker spindles are driven at a speed slightly less than the ground speed of the picker, and the overrunning clutches permit the plants, by engagement with the spindles, to pull the spindles at a speed slightly greater than that at which they are driven. Thus, any variation in the amount of slippage of the wheels results only in variation in the amount of overrunning of the clutches, and there is no pulling out of the plants.

Figure 2:
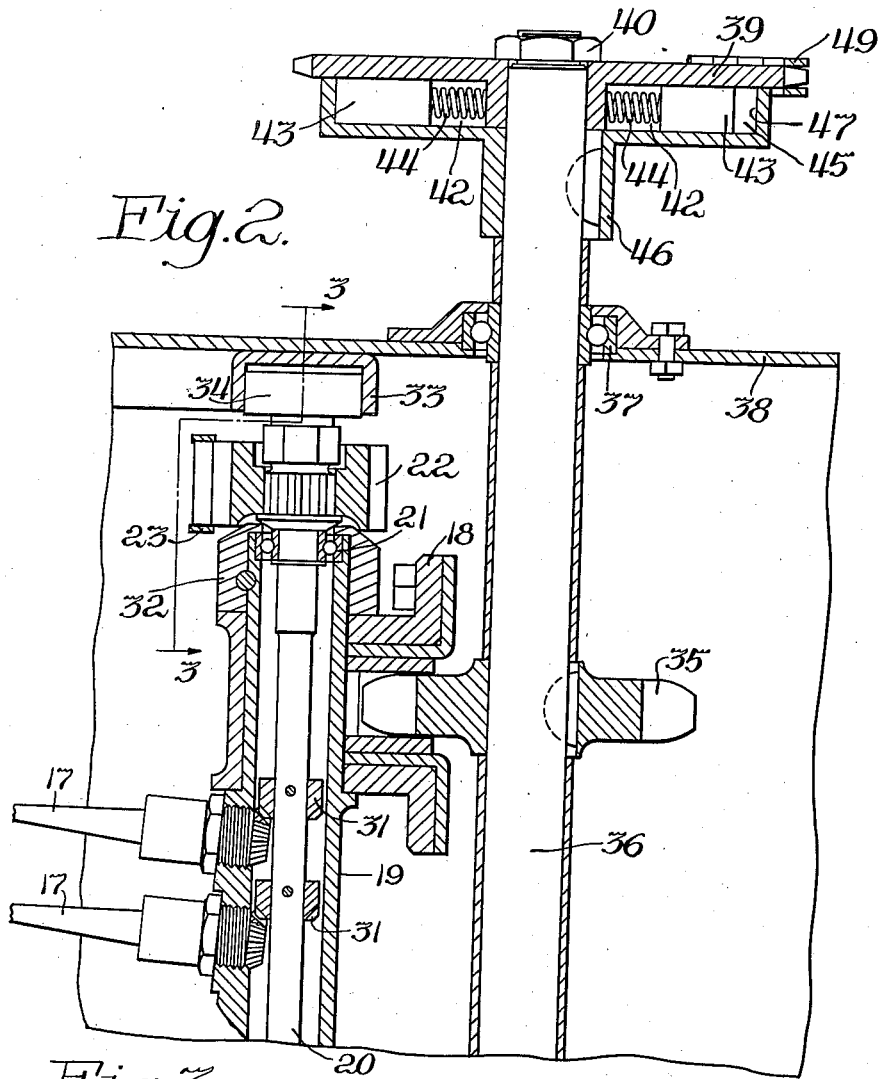
Figure 2 is a section taken along the line 2—2 of Figure 1.
Figure 3:
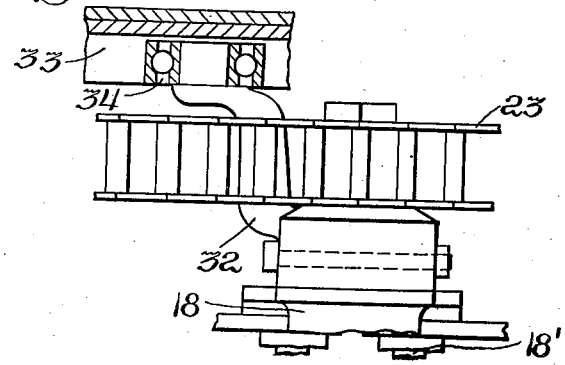
Figure 3 is a view taken along the line 3—3 of Figure 2.

The picker of the present invention, designated by the numeral 10, is mounted upon a tractor of the row crop type, of which only one rear wheel 11 is shown. The picker is supported by members 12 and 13, which extend from the rear of the tractor and carry a shaft 14, upon which the picker is pivoted. Details of the supporting of the picker from the tractor are shown in the copending application of Edward A. Johnston, Serial No. 175,199, filed November 18, 1937. The picker has plant-guiding elements 15 and 16. The picking mechanism proper comprises a pair of sets of rotatably mounted picking spindles 17, each set being carried by an element 18 in the form of links connected by pins 18', commonly called a belt. Mounted in each belt 18 is a plurality of spindle supporting bars 19, which are hollow and carry within them spindle driving shafts 20. Each driving shaft 20 is rotatably mounted at its ends within the spindle supporting bar by means of roller bearings 21. At the upper end of the driving shaft, as shown in Figure 2, is fixed a gear 22 in engagement with a sprocket chain 23. This chain is driven by means of a sprocket 24 mounted on a shaft 25. The shaft 25 has fixed to it a sprocket 26 driven by a chain 27. This chain, in turn, engages a sprocket 28 driven by a connection 29, which is, in turn, driven by some suitable source of power, such as the power take-off shaft of the tractor on which the picker is mounted.

Figure 1:
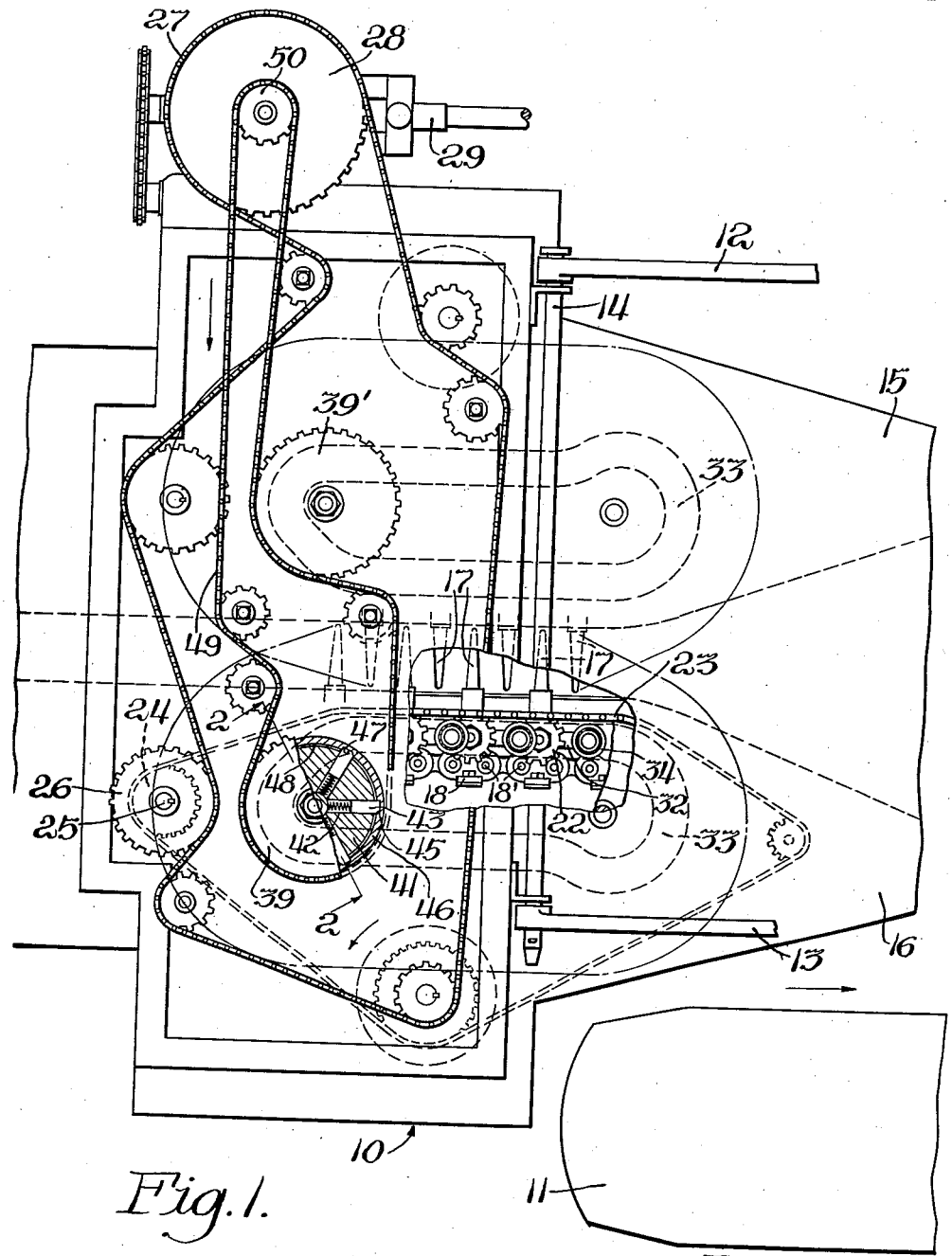
Figure 1 shows in plan, with portions removed, the novel cotton picker of the present invention.

Each picker spindle 17 is mounted for rotation about its own axis in a nearly horizontal position in the spindle-carrying bar 19, and is driven by the shaft 20 through gears 31. At the upper end of each spindle-supporting bar 19 and under the gear 22 is fixed a crank arm 32, which has its end in engagement with a cam track 33 by means of a ball bearing 34. The shape of the cam track may best be seen from Figure 1, and is such as to move the spindles 17 properly into and out of engagement with the plants. The belt 18 moves the spindles along and the cam track 33 and crank arm 32 give the proper angular movement to the spindle-carrying bar 19 and the spindles 17 as they move along. A construction of this sort is more completely shown in the patent to White 1,004,835, October 3, 1911, wherein there are picker spindles mounted in supporting bars carried by a belt, and crank arm portions of the supporting bars engage a cam track. Reference is also made to the patent to Edward A. Johnston No. 2,140,631, December 20, 1938, which shows the use of a cam track and crank arm portions of spindle-supporting bars engaging the cam track, in which the spindle-supporting bars are mounted on a drum.

As seen in Figure 2, drive of the belt 18 is effected by means of a gear 35 engaging the belt. This gear is keyed to a vertical shaft 36, which is journaled adjacent its upper end in a ball bearing 37 mounted in an upper plate 38 of the picker. The upper end of the shaft 36 extends beyond the plate 38 and has a gear 39 rotatably held thereon by means of a nut 40. The gear has a portion 41 having radial grooves 42 therein, in which are positioned dog elements 43 having at their inner ends springs 44. It will be observed from Figure 1 that each dog element 43 has a beveled edge 45. A member 46 is keyed to the shaft 36 and surrounds the portion 41 of the gear 39. It has notches 47 in an inside face 48 of a shape to receive the ends of the dog elements 43. The gear 39 is in driving engagement with a sprocket chain 49 in turn driven by a sprocket 50. This sprocket 50 is mounted coaxially with the sprocket 26 and driven from the power take-off shaft of the tractor through the connection 29. The chain 49 also drives a gear 39' similar to the gear 39, which in turn drives, through an overrunning clutch, a belt and set of spindles like those driven by gear 39.

The member 46, the dog elements 43, and the portion 41 of the gear 39 constitute an overrunning clutch which permits the belt 18 and spindles 17 to be moved along with respect to the picker at a speed greater than the gear 39, powered by the driving connection 29, drives the belt and spindles. During operation, the picker is driven along the ground with the plants to be picked guided by the elements 15 and 16 into engagement with the spindles 17. The spindles remove the cotton from the plants by rotation about their own axes, and they must move along with the belt 18 at a speed with respect to the picker frame nearly equal to the speed of the picker over the ground, in order that the spindles may not injure the plants. Let it be assumed, for example, that the ground speed of the picker is two miles per hour. Then, under the present invention, the spindles 17 and belt 18 are driven so as to be moved along with respect to the picker frame at a speed just less than ground speed, or about 1.9 miles per hour. This means that there will be a tendency toward a slight forward motion of the spindles with respect to the plants. However, the spindles, being carried by belts, engage the compressed plants for a substantial distance, and consequently the plants hold the spindles and supporting bars against bodily movement. This is permitted by the overrunning clutch constituted by the member 46 and portion 41 of the gear 39. In brief, assuming the picker speed to be 2 miles per hour, the belt and spindle speed is somewhat less, approximately 1.8 miles per hour, and accordingly their speed with respect to the plants is .1 mile per hour. However, the plants tend to hold the spindles against movement, and the speed of the belt and spindles is accordingly increased to 2 miles per hour. This increase of speed of the belt and spindles beyond the speed at which they are driven is permitted by the overrunning clutch. This arrangement is of special advantage for overcoming the disadvantages of slippage of the wheels. If, for example, there is a 5% slippage, then the ground speed of the picker is only 1.9 miles per hour and there is no overrunning of the clutch. However, if the slippage should decrease, the engagement of the plants by the spindles in the overrunning clutch permits the belt and spindles to be moved at the required speed somewhat over the driven speed of 1.9 miles per hour.

It will be apparent from the above description that a new and novel driving mechanism for a cotton picker has been provided, by which an overrunning clutch connecting the source of power and the spindle-carrying belt permits the spindles to be moved along by the plants at a greater speed than that at which they are driven. This construction is of special advantage when the spindles are carried by a pair of belts, for then the plants engage the interengaging spindles for a considerable distance and exert sufficient hold on them to make the clutch overrun and to hold the spindles and belt at ground speed of the picker. However, it will be apparent that any other suitable form of carrying means may be employed.

It is intended to limit the invention only within the scope of the appended claims.

What is claimed is:

1. In a cotton picker drawn by a tractor and having the picking mechanism thereof driven by means driven by the tractor, the combination with a belt on which a plurality of picking spindles are mounted, of a power drive connection therefor, and an overrunning clutch interposed in said power drive connection whereby, when the forward travel of the machine is greater with respect to the plants engaged by the belt than the peripheral speed of the belt as driven by the power drive connection, the belt may be overdriven by engagement with the plants.

2. In a tractor-mounted cotton picker operated by power from the tractor motor, picker mechanism comprising movable spindle supporting means with the portion thereof adjacent the plant row traveling in a direction opposite to the direction of travel of the tractor, a plurality of picking spindles carried by the supporting means for engagement with the plant row, power drive means for the supporting means including connections with the tractor motor, an over-running clutch interposed in the power drive means constructed to permit the supporting means to overrun the power drive means therefor, said power drive means being constructed and operated to move the portion of the supporting means adjacent the plant row at a speed substantially lower than the speed of the tractor, said over-running clutch providing means whereby the supporting means may be over-driven by engagement of the supporting means and the spindles with the plant row at substantially ground speed thereby preventing breaking and injury to the plants.

3. A device as set forth in claim 2 in which the power drive means operates the spindle supporting means at such a speed below the ground speed of the tractor as to allow for normal traction wheel slippage without driving the supporting means at a higher speed than the ground speed of the machine.

4. A picker comprising a source of power, supporting means, ground-engaging means, means connecting the source of power and the ground-engaging means for propelling the supporting means over the ground, plant-engaging means carried by the supporting means and adapted to be moved with respect to the supporting means at a speed approximating the ground speed of the supporting means so as to have a zero rate of speed with respect to the plants engaged, and means connecting the source of power and the plant-engaging means for driving the latter at a speed with respect to the supporting means slightly less than the ground speed of the supporting means and including an overrunning clutch permitting the speed of the plant-engaging means with respect to the supporting means to be increased, by virtue of engagement with the plants being picked, to the ground speed of the supporting means.

EDWARD A. JOHNSTON.